(12) United States Patent
Namgung

(10) Patent No.: US 6,439,339 B1
(45) Date of Patent: Aug. 27, 2002

(54) ELECTRONIC POWER STEERING APPARATUS FOR VEHICLE

(75) Inventor: Joo Namgung, Wonju (KR)

(73) Assignee: Mando Corporation, Kyunggi-do (KR)

( * ) Notice: Subject to any disclaimer, the term of this patent is extended or adjusted under 35 U.S.C. 154(b) by 0 days.

(21) Appl. No.: 09/887,902

(22) Filed: Jun. 22, 2001

(30) Foreign Application Priority Data

Jun. 1, 2001 (KR) .......................... 2001-30726

(51) Int. Cl.[7] .................................. B62D 5/04
(52) U.S. Cl. ........................................ 180/444
(58) Field of Search .................. 180/444, 443, 180/427, 428, 412, 413, 400; 74/424.71, 422, 490; 388 PS, 127

(56) References Cited

U.S. PATENT DOCUMENTS

| 3,938,589 | A | * | 2/1976 | Mott ........................... 166/325 |
| 4,724,711 | A | * | 2/1988 | Sakakibara et al. ......... 180/444 |
| 4,898,258 | A | * | 2/1990 | Ohe et al. .................... 180/444 |
| 5,927,429 | A | * | 7/1999 | Sugino et al. ............... 180/444 |
| 5,957,236 | A | * | 9/1999 | Kitazawa et al. ............ 180/444 |
| 5,988,311 | A | * | 11/1999 | Kuribayashi et al. ....... 180/444 |

* cited by examiner

*Primary Examiner*—F. Zeender
(74) *Attorney, Agent, or Firm*—R. Neil Sudol; William Sapone; Henry Coleman

(57) ABSTRACT

An electronic power steering apparatus for a vehicle which is capable of (a) improving the structures of a stop ring and a groove for thereby preventing a certain operational gap which is formed when installing the system and (b) providing a torque limiting function when an over load occurs in the motor. A circular groove in a motor shaft is formed with a beveled surface disposed in contact with a similarly beveled or inclined surface on a stop ring inserted into the groove. The stop ring is formed to be expandable in the outer direction and upon expansion in the groove moves in an axial direction due to the engaged beveled surfaces.

6 Claims, 3 Drawing Sheets

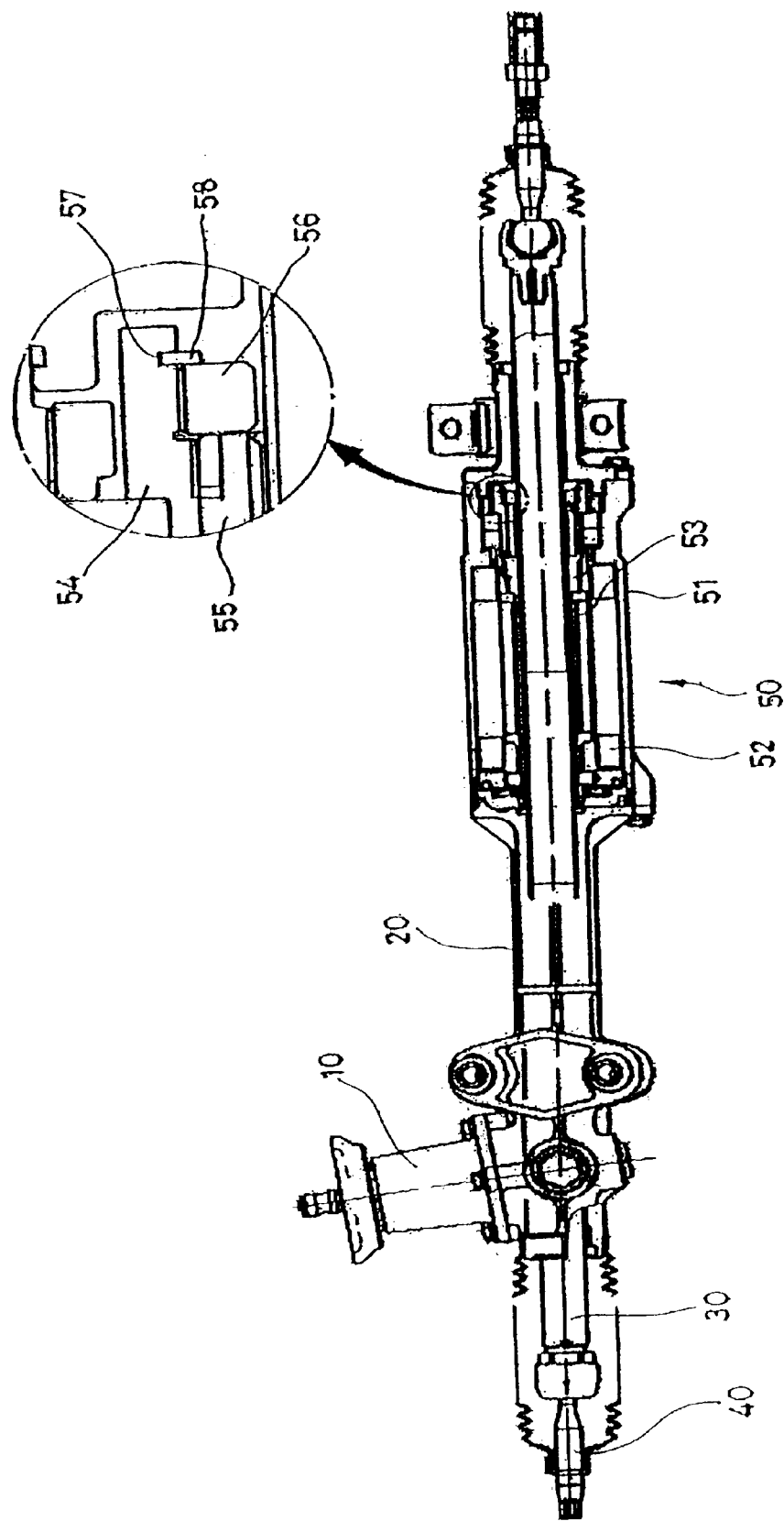
[Fig. 1]

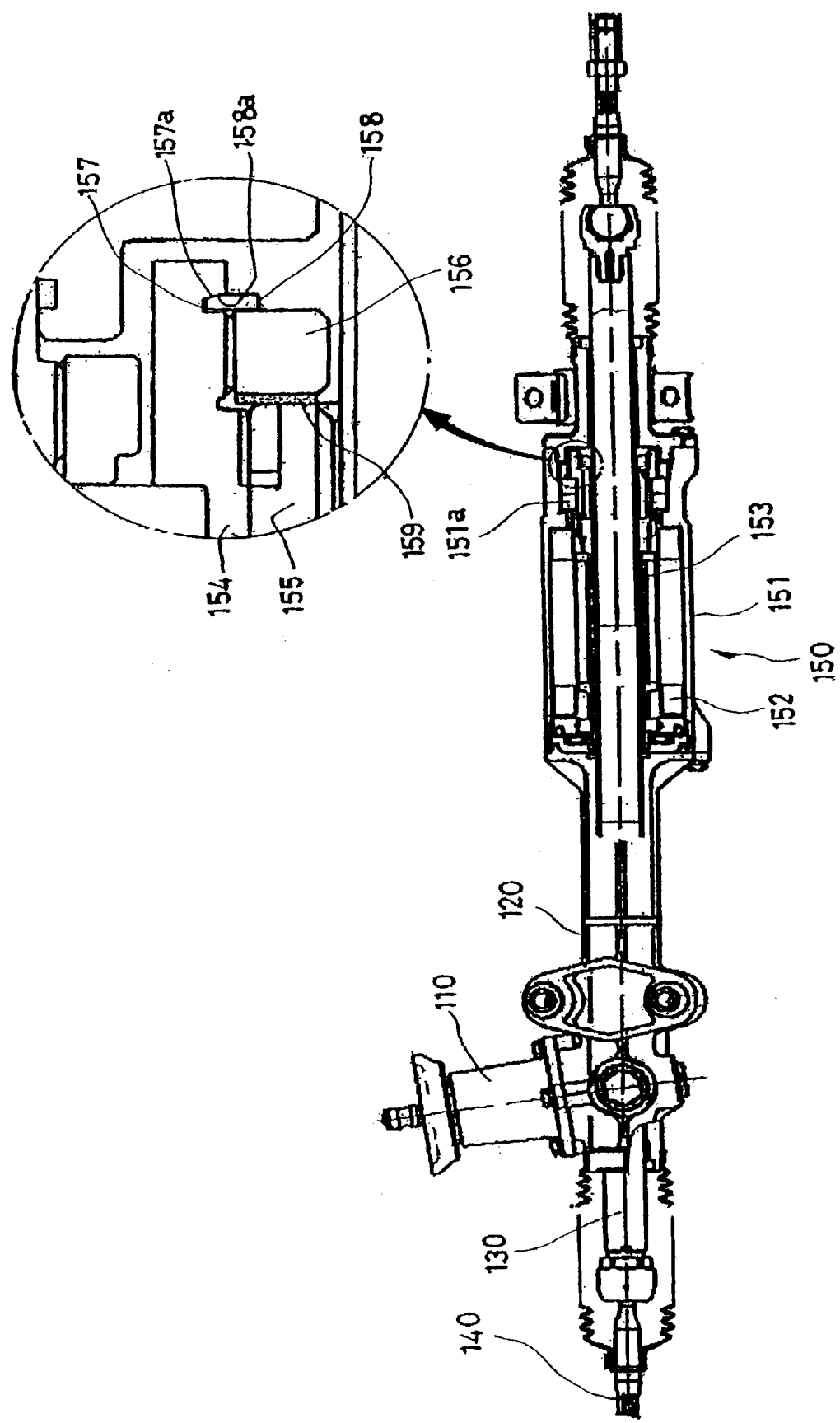
[Fig.2]

[Fig.3]
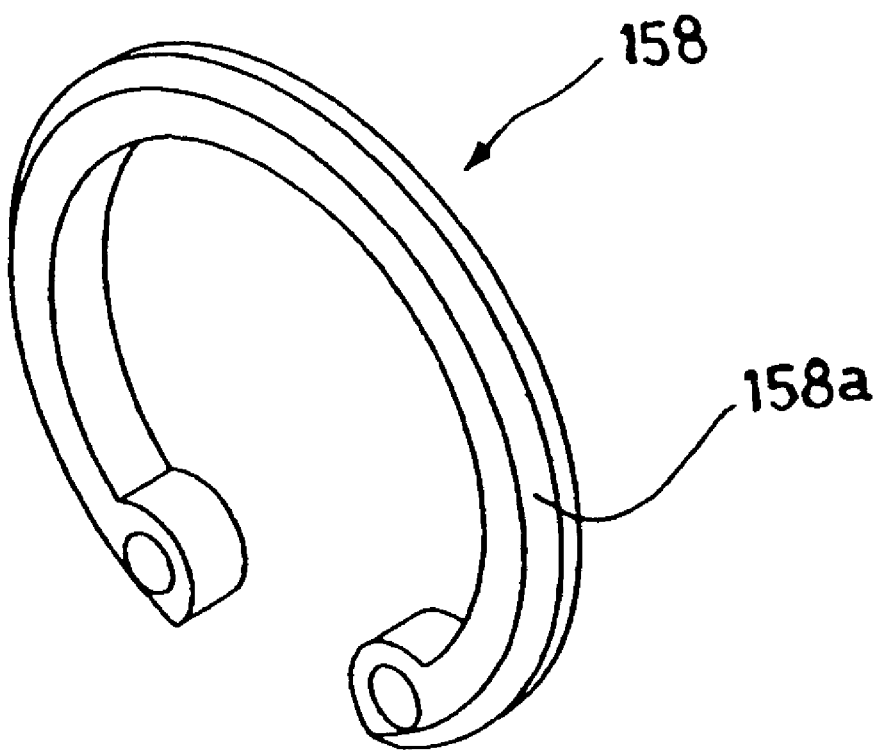

ELECTRONIC POWER STEERING APPARATUS FOR VEHICLE

BACKGROUND OF THE INVENTION

1. Field of the Invention

The present invention relates to an electronic power steering apparatus for a vehicle, and in particular to an electronic power steering apparatus for a vehicle which is capable of providing a support structure of a ball nut engaged with a motor shaft on a rack pinion type gear mechanism having a motor for thereby enhancing a steering force.

2. Description of the Background Art

Generally, a steering apparatus for a vehicle is directed to changing a running direction of a vehicle and includes an operating mechanism formed of a steering wheel, a steering shaft and a steering column, a gear mechanism for changing an operating direction of the operating mechanism, and a link mechanism for transferring a movement of the gear mechanism to a steering wheel.

The gear mechanism includes a worm sector type formed of a worm gear and a sector gear, and a rack pinion type which is operated based on a combination of a rack gear and a pinion gear. The electronic power steering apparatus further includes a motor and a decelerator capable of enhancing a steering force of the gear mechanism.

FIG. 1 is a cross sectional view illustrating a conventional rack pinion type electronic power steering apparatus. As shown therein, the conventional rack pinion type electronic power steering apparatus includes a torque sensor 10 for receiving a rotational force from the operating mechanism, a pinion housing 20 which is installed across the torque sensor 10 and has a rack bar 30 therein, a tie rod 40 formed at both ends of the rack bar 30, and a motor 50 installed at an intermediate portion of the rack bar 30.

The motor 50 includes a motor housing 51 having a certain diameter larger than that of the pinion housing 20, a stator 52 installed closely to an outer surface of the interior of the same, a rotor 53 rotatably installed in an inner side of the stator 52, a motor shaft 54 extended toward the inner side of the rotor 53, and a ball nut 55 provided at one end in the interior of the motor shaft 54.

At this time, a screw groove is formed in an inner side of the ball nut 55 and an outer side of the rack bar 30, and a ball is disposed therebetween. Therefore, when the ball nut 55 is rotated, the rack bar 30 is moved in the axial direction.

One end of the motor shaft 54 is closely contacted with a step formed in the interior of the ball nut 55, and the other end of the same is fixed by a lock screw 56, and a stop ring 58 is installed in a rear side of the lock screw 56.

The lock screw 56 is capable of preventing an escape of the ball nut 55 and includes a threaded portion formed in an outer surface of the same for thereby being engaged with a threaded portion formed in the interior of the motor shaft 54. The stop ring 58 is capable of preventing an escape of the lock screw 56 and is inserted onto the outer portion of the groove 57 formed in the interior of the motor shaft 54, so that the inner side supports the lock screw 56.

In the conventional motor, the groove in which the stop ring is installed and the cross section of the stop ring are formed in a square shape, and the width of the groove is larger compared to the thickness of the stop ring for a smooth installation. Therefore, there is a certain operational gap therebetween.

Therefore, if the lock screw is loosened, since the lock screw is moved in the axial direction by the distance corresponding to the operational gap between the stop ring and the groove, the rotation and reciprocating movement of the ball nut fixed in the interior of the motor shaft becomes free.

Namely, since the rotational force transferred from the motor shaft to the ball nut is not properly obtained, a certain problem occurs in the steering force, and a noise occurs because the ball nuts collide with each other.

In addition, since a torque limit device is not provided, the motor may be damaged when an overload occurs.

SUMMARY OF THE INVENTION

Accordingly, it is an object of the present invention to provide an electronic power steering apparatus for a vehicle which overcomes the problems encountered in the conventional art.

It is another object of the present invention to provide an electronic power steering apparatus for a vehicle which is capable of improving the structures of a stop ring and a groove for thereby preventing a certain operational gap which is formed when installing the system and providing a torque limiting function when an over load occurs in the motor.

To achieve the above objects, there is provided an electronic power steering apparatus for a vehicle according to the present invention in which a groove is formed in a circular shape, an inner tapered surface is formed in an outer surface, a stop ring is formed to be expandable in the outer direction, and an outer tapered surface is formed in a portion opposite to the inner tapered surface at an outer surface for thereby being closely contacted with the groove based on a movement in the axial direction due to the expansion force of the stop ring wherein the electronic power steering apparatus for a vehicle includes a motor housing provided at an intermediate portion of a pinion housing having a rack bar therein, a ball nut inserted into an inner end portion of the motor shaft which is rotatable in the interior of the motor housing and moves the rack bar, a lock screw engaged to a portion of the motor shaft for thereby closely contacting the ball nut to the inner portion of the motor shaft, a groove formed in a rear portion of the lock screw, and a stop ring inserted into the groove and supporting the rear portion of the lock screw.

BRIEF DESCRIPTION OF THE DRAWINGS

The present invention will become better understood with reference to the accompanying drawings which are given only by way of illustration and thus are not limitative of the present invention, wherein;

FIG. 1 is a cross sectional view illustrating a conventional electronic power steering apparatus for a vehicle;

FIG. 2 is a cross sectional view illustrating an electronic power steering apparatus for a vehicle; and FIG. 3 is a perspective view illustrating a stop ring according to the present invention.

DETAILED DESCRIPTION OF THE PREFERRED EMBODIMENTS

The present invention will be explained with reference to the accompanying drawings.

FIG. 2 is a cross sectional view illustrating an electronic power steering apparatus for a vehicle according to the present invention. As shown therein, the electronic power steering apparatus for a vehicle includes a pinion housing 120 which is installed across a torque sensor 110 and has a rack bar in the interior of the same, and a tie rod 140 extended from both sides of the rack bar 130.

In addition, a motor 150 is installed at an intermediate portion of the rack bar 130. The motor 150 includes a motor housing 151 connected with the pinion housing 120, a stator 152 fixed in the interior of the motor housing 151, a rotor 153 installed in the inside of the stator 152, a motor shaft 154 longitudinally formed in the direction of the inner portion of the rotor 153 and installed based on an angular contact bearing 151a, and a ball nut 155 installed at an end inner portion of the motor shaft 154.

A threaded groove is formed in an inner side of the ball nut 155 and an outer portion of the rack bar 130, respectively, and the rack bar 130 is moved in the axial direction when the ball nut 155 is rotated based on the balls disposed therebetween.

In the ball nut 155, one end of the motor shaft 154 is closely contacted with a step formed in the interior of the same, and the other end of the same is is fixed by a lock screw 156. A stop ring 158 is formed in a rear portion of the lock screw 156.

Namely, a threaded portion is formed in an outer surface of the lock screw 156 and is engaged with a threaded portion formed in the interior of the motor shaft 154, and the stop ring 158 is inserted into a groove 157 formed in the interior of the motor shaft 154, so that an inner circumferential portion of the same is supported by the lock screw 156.

In the present invention, a friction member 159 is provided between the ball nut 155 and the lock screw 159 for thereby performing a torque limiting function when an over load occurs in the motor 150.

The friction member 159 is installed between the inner step of the motor shaft 154 and one side of the ball nut 155 which is closely contacted with the inner step of the same, so that the friction member 159 slides when an over load occurs in the motor 150 for thereby preventing a damage of the motor 150.

Namely, the friction member 159 is formed of a hallow circular plate for thereby being disposed in an outer portion of the rack bar 130 and is installed between the ball nut 155 and the lock screw 156 for thereby performing a torque limiting function.

In addition, in the present invention, the stop ring 158 and the groove 157 are formed for thereby preventing a certain operational gap which is formed when installing the stop ring 158.

The groove 157 is formed in a circular shape in the interior of the motor shaft 154, and the cross section of the groove 157 is rectangular. The groove 157 is formed in a bevel shape in which there is provided an inner tapered surface 157a.

As shown in FIG. 3, the stop ring 158 is provided to correspond with the groove 157 and is inserted into the groove 157. The stop ring 158 has a certain thickness smaller than that of the groove 157.

The stop ring 158 includes an opened center portion and is inserted into the interior of the groove 157 and has a diameter larger than that of the groove 157 for thereby being enlarged in the outer direction and has a cut outer portion.

In addition, a bevel shape stop ring 158 has an outer surface 158a tapered to correspond with the inner tapered surface 157a.

Namely, the force applied to the outer portion of the stop ring 158 is converted into a force in an axial direction by the outer tapered surface 158a and the inner tapered surface 157a, so that the stop ring 158 is closely contacted with the inner lock screw 156 of the groove 157.

In the electronic power steering apparatus for a vehicle according to the present invention, in a state that the ball nut 155 is inserted into the motor shaft 154, and the friction member 159 is engaged to one surface of the lock screw 156, the lock screw 156 is inserted into the interior of the motor shaft 154 and is rotated for thereby pressing the friction member 159 and supporting the rear portion of the ball nut 155.

In addition, the stop ring 158 is installed in the rear portion of the lock screw 156 for thereby preventing the movement of the lock screw 156 in the axial direction.

At this time, the stop ring 158 is retracted in the inner circumferential surface portion for an expansion in the outer direction and is inserted into the groove 157, and the outer portion of the stop ring 158 is distanced from the outer side of the groove 157.

The outer tapered surface 158a of the stop ring 158 and the inner tapered surface 157a of the groove 157 are closely contacted, and the outer tapered surface 158a is closely contacted with the inner tapered surface 157a by a force which is applied to the outer side of the stop ring 158.

The outer side of the stop ring 158 is closely contacted with the outer side of the groove 157, and the stop ring 158 is closely contacted with an inner surface of the groove 157, so that it is possible to prevent a loosening of the lock screw 156 which is closely contacted with the inner surface of the stop ring 158.

When an over load occurs in the motor 150, the motor shaft 154 and the ball nut 155 slide by the friction member 159 for thereby implementing a torque limiting function which limits the rotational force applied therebetween.

As described above, in the electronic power steering apparatus for a vehicle according to the present invention, the bevel type stop ring which is originally constructed to move from the inner side of the bevel type groove to the outer side generates a supporting force in the axial direction by the opposite tapered surfaces for thereby preventing an operational gap of the lock screw connected thereto. In addition, since the friction member having a torque limiting function is disposed between the motor shaft and the ball nut, it is possible to prevent the motor from being damaged due to the over load.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In an electronic power steering apparatus for a vehicle which includes a motor housing provided at an intermediate portion of a pinion housing having a rack bar therein, a ball nut inserted into an inner end portion of a motor shaft which is rotatable in an interior of the motor housing and moves the rack bar, a lock screw engaged to a portion of the motor shaft for thereby closely contacting the ball nut to the inner end portion of the motor shaft, a groove formed in a rear portion of the motor shaft, and a stop ring inserted into the groove and supporting a rear portion of the lock screw, the improvement wherein:

(a) the groove is circular with a tapered cross-section defined by an inner tapered surface; and (b) the stop ring is formed to be expandable in the outer radial direction, and is formed with an outer tapered surface opposite to the inner tapered surface of the groove for thereby being closely contacted with the groove based on a movement to the motor shaft direction along a central axis due to the expansion force of the stop ring.

2. The improvement of claim 1, wherein a friction member is provided between the lock screw and the ball nut for thereby performing a torque limiting function.

3. In an electronic power steering apparatus for a vehicle which includes a motor housing provided at an intermediate portion of a pinion housing having a rack bar therein, a ball nut inserted into an inner end portion of a motor shaft which is rotatable in an interior of the motor housing and moves the rack bar, a lock screw engaged to a portion of the motor shaft for thereby closely contacting the ball nut to the inner end portion of the motor shaft, a groove formed in a rear portion of the motor shaft, and a stop ring inserted into the groove and supporting a rear portion of the lock screw, the improvement wherein the groove is circular with a tapered cross-section defined by a first beveled surface and wherein the stop ring is formed to be expandable in a radial outward direction and is provided with an outer tapered portion defined by a second beveled surface disposed in contact with the first beveled surface for generating a movement of the stop ring in an axial direction due to an expansion of the stop ring in the radial outward direction.

4. The improvement of claim 3 wherein a friction member is provided between the lock screw and the ball nut for thereby performing a torque limiting function.

5. An electronic power steering apparatus for a vehicle comprising:

a pinion housing;

a rack bar at least partially disposed in said pinion housing;

a motor housing provided at an intermediate portion of said pinion housing;

a motor shaft rotatably disposed in said motor housing and operatively connected to said rack bar;

a ball nut inserted into an inner end portion of said motor shaft;

a lock screw engaged with said motor shaft for maintaining said ball nut in position in said inner portion of said motor shaft, a circular groove being formed in a rear portion of said motor shaft, said groove having a tapered cross-section defined in part by a first beveled surface in said groove; and a stop ring inserted into said groove and supporting a rear portion of said lock screw, said stop ring being expandable in a radial direction, said stop ring being formed with a second beveled surface engaging said first beveled surface to convert a radial expansion of said stop ring under internal spring forces into an axially directed displacement of said stop ring.

6. The apparatus of claim 5 wherein a friction member is provided between the lock screw and the ball nut for thereby performing a torque limiting function.

* * * * *